United States Patent [19]
Parsons

[11] 3,951,511
[45] Apr. 20, 1976

[54] ASTRONOMICAL TELESCOPE MOUNT

[76] Inventor: J. Howard Parsons, 15702 Stanbrook Drive, La Mirada, Calif. 90638

[22] Filed: Dec. 19, 1973

[21] Appl. No.: 426,111

[52] U.S. Cl. ............................................... 350/83
[51] Int. Cl.² ......................................... G02B 23/16
[58] Field of Search ................................ 350/82–85

[56] References Cited
UNITED STATES PATENTS

| 395,002 | 12/1888 | Saegmuller | 350/83 |
| 583,518 | 6/1897 | Stoller | 350/83 |
| 1,118,564 | 11/1914 | Lupton | 350/83 |
| 2,711,589 | 6/1955 | Stock | 350/83 X |
| 2,981,572 | 4/1961 | Kuhne | 350/82 X |
| 3,257,728 | 6/1966 | Blomquist | 350/85 X |
| 3,606,520 | 9/1971 | Rockwell | 350/85 X |

FOREIGN PATENTS OR APPLICATIONS

| 1,353 | 1874 | United Kingdom | 350/83 |
| 21,132 | 1894 | United Kingdom | 350/85 |
| 1,120,736 | 12/1961 | Germany | 350/85 |

Primary Examiner—David H. Rubin
Attorney, Agent, or Firm—Herzig & Walsh, Incorporated

[57] ABSTRACT

An improved astronomical telescope mount having a polar axis column which is adjustably positionable; a telescope and supporting bracket with universal means at an end part of the column whereby the optical axis of the telescope lies in the plane of the column. The supporting bracket is rotatable about the polar axis and about an axis of declination which is normal to and intersects the polar axis. The mounting permits maneuvering of the telescope to any geometrical orientation without interference. The telescope support bracket is mounted on a platform having a stem rotatably mounted in a hub which is adjustably positioned in the column. The column has an hour angle scale on it, the hub having a reference marker and a sidereal time scale on it, and said platform having a reference marker on it. Tracking means are provided as between the telescope platform and the hub by way of a gear on the hub which can be locked to or released with respect to the hub. In operation, the mechanism as described computes sidereal time after the hour angle has been set and continually indicates it while the telescope may be adjusted to view any celestial body.

6 Claims, 4 Drawing Figures

U.S. Patent   April 20, 1976   3,951,511
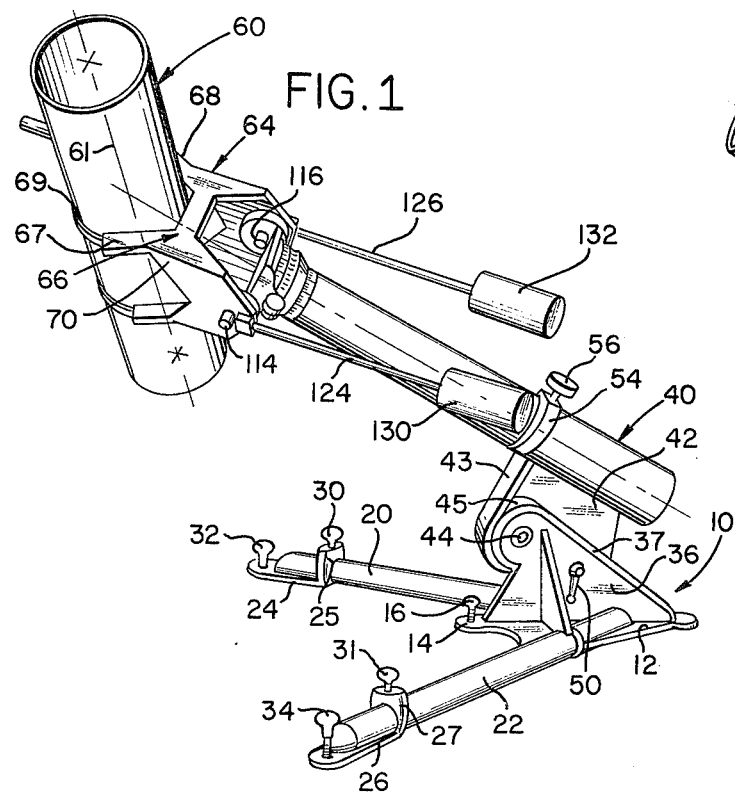
FIG.1
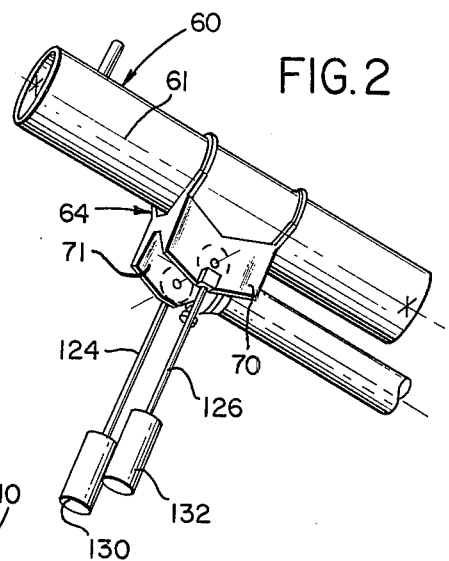
FIG.2
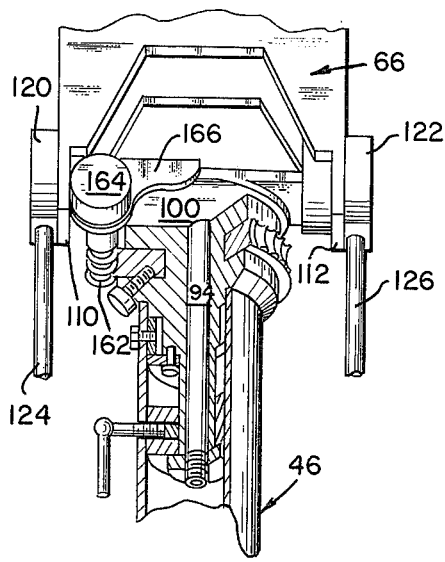
FIG.3
FIG.4

3,951,511

ASTRONOMICAL TELESCOPE MOUNT

SUMMARY OF THE INVENTION

The invention is an improved optical telescope, the improvements residing particularly in the mounting of the telescope and in mechanism to compute and indicate the sidereal time.

With respect to background, reference is made to the following U.S. Pat. Nos.: 395,002; 575,215; 583,518; 1,118,564; 2,711,539; 2,908,459; 3,603,664; and 3,606,520.

It is believed that the prior art patents represent typical types of conventional astronomical telescopes. Such a conventional type of scope is illustrated in advertising material of Colonial Optical Company, 1954 South La Cienega Boulevard, Los Angeles, Calif. 90034. The telescope of the invention particularly in its support and drive embodies certain, unique constructions, features, and characteristics not present in known telescope mounts.

In the preferred, exemplary form of the invention described herein, particular improvements reside primarily in the universal mounting support of the telescope and in the operation of the tracking means to drive the scope relative to a sidereal time scale which is settable relative to an hour angle or position scale on a scope support column. The support means comprises an adjustable support column, at the end of which the telescope is supported by a bracket having universal mounting as will be described in detail, allowing for rotation about the polar axis which is the axis of the column and about an axis of declination which is normal to and intersects the polar axis. The optical axis is spaced from the declination axis, but always lies in the plane of the polar axis.

Tracking means are provided whereby the platform part of the telescope support bracket has tracking movement relative to the hub which is adjustably positionable in the aforesaid column. The hub has a reference marker which can be set relative to an hour angle scale on the column. The hub also has a sideral time scale, and said platform has a reference marker which, while tracking, moves relatively to the sidereal time scale on the hub. A gear drive between the platform and the hub is releasable for purposes of relative settings, and the hub is adjustable and settable in the column.

From the foregoing abstract and introduction to the invention, the following objects and their realization will be appreciated.

The primary object is to provide a mount for the telescope which then can be freely maneuvered and oriented into any geometric orientation without interference between the moving parts and support members.

A further object is to realize a further purpose in a device as in the previous object, wherein the optical axis remains in the same plane as the axis of the support column on which, when the telescope support bracket is mounted for rotation around the polar axis and also around an axis of declination which is normal to the polar axis and intersects it and is spaced from the optical axis.

A further object is to provide automatic tracking mechanism in the telescope enabling it to track and to provide means whereby, when tracking, the sidereal time is computed and indicated by way of a reference marker associated with the moving telescope mount and a sideral time scale on a hub carried by the supporting column. Associated with this object is the purpose of providing a position or hour angle scale on the supporting column with a reference marker on an adjustable hub for purposes of setting the hub initially to a particular position or hour angle setting.

BRIEF DESCRIPTION OF THE DRAWINGS

Further objects and additional advantages of the invention will become apparent from the following detailed description and annexed drawings, wherein:

FIG. 1 is a pictorial view of the telescope in one of its positions;

FIG. 2 is a partial view, similar to that of FIG. 1, with the telescope in another adjusted position;

FIG. 3 is a partial view, partially in section of the telescope mounting; and

FIG. 4 is a partial view, partially in section of the telescope mounting.

DESCRIPTION OF THE PREFERRED EMBODIMENT

In the drawings, a mount is generally designated at 10. The mount comprises a generally triangular base plate 12 having an extending projection 14 through which extends a leveling screw 16. Integrally joined to base 12 are supporting rods or stems 20 and 22 which may be tubular. These stems are disposed at an angle forming a V as shown. At the ends of these stems are adjustable feet or brackets 24 and 26 having right angle parts 25 and 27 as shown, through which the stems extend and which may be secured by wing nuts 30 and 31. Extending through the horizontal part of these feet or brackets are leveling screws 32 and 34.

Upstanding from the base 12 of mount 10 is a plate 36 having a configuration as shown. The upper edge of plate 36 has transverse rib 37.

Numeral 40 designates a tubular stem, the axis of which is the polar axis of the telescope and at the end of which the telescope itself is adjustably mounted and supported. Numeral 42 designates a support plate which is integral with tubular stem 40 and which extends radially therefrom. The front edge of plate 42 has a transverse rib 43. Plate 42 is juxtaposed against mounting plate 36 and is pivotally attached thereto with pivot pin 44. The upper left part of plate 36 is arcuate as designated at 45. The adjacent juxtaposed part of plate 42 is also arcuate, and the edge of rib 43 fits over rib 37 as shown. Plate 42 may be locked or secured in angular positions with respect to plate 36 by way of a handle 50 on the end of setting screw 51.

Integral with mounting plate 42 is holder bracket 54 through which tubular member 40 extends, and it may be secured in any adjusted position by adjusting screw 56.

The telescope is designated diagramatically at 60, having an optical axis 61. It is universally mounted at the end of stem 40. The details of the mounting are shown particularly in FIGS. 3 and 4. Telescope 60 is held in a mounting bracket 64 having a configuration as shown in FIGS. 1, 2, and 3. Bracket 64 is of rectilinear configuration having end yokes, one of which is designated at 66 having legs 67 and 68 which straddle the telescope as shown. The yoke forms a saddle to receive the telescope and secured by a band 69 which may be flexible and attached to legs of the yoke. The yoke at the opposite end of bracket 64 is similar. Bracket 64 has side parts 70 and 71 between the two end yokes.

Telescope holding bracket 64 is universally mounted or joined to the end of the supporting column or tube 40 which is the polar axis. Telescope 60 and bracket 64 are mounted as will be described to provide for universal movement, including angular movement about the polar axis and angular movement about the axis of declination which is normal to and intersects the polar axis. As will be observed, the optical axis is spaced from the declination axis, but it intersects the polar axis. More particularly, it is always in the plane of the polar axis.

Referring to FIGS. 3 and 4, at the upper end of column 40, there is a fitting or hub 80 having an upper part or diameter 81, an intermediate smaller diameter 82 adjacent to which is bevel or taper 83, a further intermediate diameter 84 adjacent to which is a square radial shoulder 85, a further smaller diameter 86, a further smaller diameter 87, and a final tubular part or diameter 88. Hub member 80 has a bore 92 as shown.

Received in bore 92 is a cylindrical stem 94, the lower end of which is threaded at 95. At the threaded lower end of stem 94 is a nut 140. Plate or platform 100 is rotatable relative to hub 80, the upper part or diameter of which is designated at 81 and is graduated through 0°–360°, the graduations being designated at 141 to present a sidereal time scale. Nut 140 does not jam against hub 80.

At the upper end of stem 94 is a circular plate or hub member 100. On diametrically opposed sides of the plate are integral, cylindrical bearing or trunion members 102 and 104 having bores 103 and 105.

Referring to sides 71 of bracket 64, these side parts have intermediate, downwardly depending portions 110 and 112. Extending through these portions are shafts or arbors 114 and 116 which journal in the trunion bearings 102 and 104. Attached on the outsides of the depending parts 110 and 112 of sides 70 and 71 of bracket 64 are holding blocks 120 and 122 to which are integrally secured tubular stems 124 and 126 at the ends of which are counter-balance weights 130 and 132. It should be observed that stems 124 and 126 and counterbalance weights 130 and 132 are spaced laterally from the polar axis and allow free swinging movement of the telescope about the axis of declination 136 which is the axis of the shafts or arbors 114 and 116 as seen in FIG. 4. The optical axis remains in the plane of the polar axis 40. In production, holding blocks 120 and 122 will be on pivots so that the weights can be adjusted angularly about these pivots for counterbalancing such as with respect to a camera mounted on the telescope.

Numeral 148 designates a gear having a bore 149. This gear is mounted on intermediate diameter 79 of hub 80 which is intermediate diameters 81 and 82. Graduations 141 on diameter 81 represent the sidereal time circle as stated. Numeral 152 designates a reference mark or line on tapered part 83 of hub 80. Surrounding tube 40 is a sleeve 154, the upper end of which terminates at the tapered part 83 of hub 80, its upper end being against shoulder 85. On the exterior of the upper end of sleeve 154 there are graduations from 0° to 360°, these graduations representing a fixed hour angle circle designated at 156.

Numeral 160 designates a thumb screw which extends through a bore 157 in tapered part 83 of hub 80. The end of this screw extends into a bore 158 in gear 148, whereby this gear can be locked and positioned relative to hub 80 (and scale 81). Numeral 162 designates a worm gear positioned to mesh with gear 148 as shown. At the end of worm gear 162 is a motor housing 164 carrying a driving motor, this housing being mounted on bracket 165 which is integral with circular plate 100, as may be seen in FIG. 3. If thumb screw 160 is retracted, gear 148 is freed to rotate relative to hub 80, that is relative to column 40. Then, the telescope and bracket 165 and platform 100 along with the driving motor carried by plate 100 and gear 148 can be freely rotated relative to column 40. Thus, the telescope and gear 148 can be set in any angular position with respect to polar axis 40. When thumb screw 160 is again set, gear 148 is locked to hub 80 in column 40; and when the motor in housing 164 operates to drive the worm gear, the telescope and bracket are rotated about the polar axis. In normal utilization, the telescope may be set so that its optical axis points at a desired celestial body which is to be tracked, and the motor is driven by conventional tracking equipment to cause the optical axis to stay fixed on and follow that particular celestial body. The tracking equipment is not shown since it is conventional other than as explained. When tracking platform 100 and the telescope rotate relative to hub 80, reference mark 101 moves relative to scale 141 to indicate sidereal time, reference mark 152 having been set to the hour or position angle on scale 156 to thereby position hub 80 and scale 141.

Numeral 166 designates a circular member which is inside sleeve 154 at the position of diameter 87 of hub 80, and it is secured in this position by screws, one of which is shown at 167. Numeral 170 designates a circular member having bore 171 which fits around the tubular end part 88 of hub 80 which is secured to the lower radial surface of diameter or part 87 of hub 80 by screws such as shown at 72. Circular member 170 bears axially against circular plate 166. As may be seen, hub 80 is held axially or restrained by circular plate 160 and plate 171. Numeral 176 designates a ring-shaped member having a bore 177 which fits around lower tubular part 88 of hub 80 within sleeve 154. Threaded stem 151 extends radially through sleeve 154 and ring member 176 and engages a block member 180 in bore 181, whereby hub 80 can be locked as to angular movement relative to sleeve 154 or can be released for relative angular movement.

OPERATION

The following summarizes the operation and use of the astronomical telescope.

Firstly, threaded lock member 50 is loosened. Hub 80 is then free to be rotated in column 40, and it is rotated until reference marker 152 on bevel 83 is set to the hour angle (position angle) on scale 156. This is taken from a table for the particular heavenly body which is going to be watched, which in the specific example is Arcturus. The hour or position angle is taken from the table and is a fixed quantity. That is, astronomically speaking, it is the longitude of that particular heavenly body measured from the first point of Aries which is a fixed point. Now, reference line 152 of hub 80 has been set to the hour angle on hour angle scale 156. Platform 100 has rotated with hub 80.

Set screw 160 is backed off and loosened; and the telescope is pointed at the celestial body (Arcturus), platform 100 being rotated and driving motor 164 rotating with it. Worm 162 pulls gear 148 around with it relative to hub 80. The telescope is now pointed at Arcturus, so reference marker 101 on platform 100 now comes opposite a graduation on sidereal time scale 141. This reads the sidereal time, since scale 141 has been set previously (hub 80—reference mark 152) relative to scale 156 (hour angle). The settings in effect compute the sidereal time. The sidereal time is readable in hours on the scale. Screw 160 is clamped. The necessary tracking equipment carried on platform 100 operates motor 164 and causes the optical axis to track Arcturus. When reference marker 101 now starts moving, it is locating (indicating) the sidereal time, i.e., platform 100 is rotating relative to hub 80.

In the event that one wants to point the telescope at some new star or celestial body, setting handle 50 is loosened, and the operator rotates the telescope and its platform 100, hub 80 turning with it as it is turned until reference marker 152 is opposite the hour angle (position angle) for that body which has been obtained from a table. Clamp 50 is now reclamped, clamping hub 80 to column 40. Having done this, the telescope is now pointing at that star and starts tracking. Set screw 160 has remained locked, so now reference marker 101 moves adjacent scale 141, and it is still indicating the present sidereal time. Scale 141 can be thought of as a sidereal clock, the operation of which is not interrupted.

In previously known telescopes, the first thing done is to determine the user's Earth longitude from a map. Then, accurate solar time is determined. Then, a table is consulted; and from the date and local solar time, Greenwich sideral time is calculated. The herein invention eliminates these steps and particularly eliminates the need to calculate the sidereal time. The device of this application embodies a sidereal time clock, and more particularly, provides a way of setting the sidereal time clock without having to calculate the sidereal time from the longitude and Greenwich sidereal time.

It is to be noted that when the telescope is set to a new hour angle to look at a different star, the telelscope and its platform and hub 80 are manually moved together. While, they are moving together, the tracking mechanism is still operating to drive gear 148 and hub 80 relative to platform 100. At this time, screw 160 is locked and remains locked once it has been set.

In the light of the foregoing, those skilled in the art will readily understand the nature and construction of the invention and the manner in which it achieves and realizes all of the objectives as set forth in the foregoing.

The foregoing disclosure is representative of a preferred form of the invention and is to be interpreted in an illustrative rather than a limiting sense, the invention to be accorded the full scope of the claims appended hereto.

What is claimed is:

1. An optical instrument embodying a telescope having a column containing a polar axis, mounting means for rotation about said polar axis, the mounting means including an adjustable hub and telescope support the support and the hub being associated for relative rotation, the adjustable hub being settable to a predetermined position relative to a position angle scale on the column; tracking means whereby the telescope is rotatable relative to the hub during tracking and release means whereby the telescope can be rotated freely relative to the hub, the hub having a sidereal time scale whereby a reference mark having a fixed position relative to the telescope can be positioned relative to said sidereal time scale whereby the mechanism computes the sidereal time during tracking and indicates it on said sidereal time scale.

2. A device as in claim 1, including a polar axis column on which the hub is carried and manually settable means for securing the hub to the column and releasing it.

3. A device as in claim 1, wherein said tracking means embodies a gear carred by said hub and means for securing the gear with respect to the hub and releasing it.

4. An optical instrument embodying a telescope having mounting means for rotation about a polar axis; a support column establishing a polar axis; tracking means whereby the telescope is rotatable during tracking about the polar axis; and relatively angularly adjustable means carrying a sidereal time scale coincident with the polar axis, said last means having a reference marker settable with respect to an hour angle scale on said support column, the telescope mounting means having a reference marker movable relative to the sidereal time scale to indicate the sidereal time.

5. An instrument as in claim 4, including driving means comprising an element carried by said means having the sidereal time scale and releasably connected thereto whereby the telescope can be angularly adjusted relative to said means.

6. An instrument as in claim 5 wherein the telescope mounting means comprises a support member for the telescope, the tracking means comprising drive means carried by the support member and having connection with the said element carried by the means carrying the sidereal time scale.

* * * * *